(12) United States Patent
He et al.

(10) Patent No.: US 12,730,561 B2
(45) Date of Patent: Sep. 8, 2026

(54) TECHNIQUES TO IMPROVE BOOT UP LATENCY OF A MEMORY SYSTEM

(71) Applicant: Micron Technology, Inc., Boise, ID (US)

(72) Inventors: Deping He, Boise, ID (US); Xing Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 37 days.

(21) Appl. No.: 19/022,872

(22) Filed: Jan. 15, 2025

(65) Prior Publication Data

US 2025/0238138 A1 Jul. 24, 2025

Related U.S. Application Data

(60) Provisional application No. 63/623,720, filed on Jan. 22, 2024.

(51) Int. Cl.

| | |
|---|---|
| ***G06F 3/06*** | (2006.01) |
| ***G06F 9/4401*** | (2018.01) |

(52) U.S. Cl.
CPC .......... *G06F 3/0611* (2013.01); *G06F 3/0655* (2013.01); *G06F 3/0679* (2013.01); *G06F 9/4401* (2013.01)

(58) Field of Classification Search
None
See application file for complete search history.

(56) References Cited

U.S. PATENT DOCUMENTS

| | | | | |
|---|---|---|---|---|
| 10,748,462 | B2 * | 8/2020 | Zhou | G11C 16/0483 |
| 2020/0034223 | A1 * | 1/2020 | Rori | G06F 11/073 |

* cited by examiner

*Primary Examiner* — Brian R Peugh
(74) *Attorney, Agent, or Firm* — Holland & Hart LLP

(57) ABSTRACT

Methods, systems, and devices for techniques to improve boot up latency of a memory system are described. As one example of the methods, a memory system may receive an indication to perform a power down operation and write, based on the indication, information corresponding to the power down operation to a first block of memory cells used to store bad block information. Further, the memory system may perform the power down operation based on writing the information corresponding to the power down operation to the first block of memory cells.

33 Claims, 5 Drawing Sheets

300

TECHNIQUES TO IMPROVE BOOT UP LATENCY OF A MEMORY SYSTEM

CROSS REFERENCE

The present application for patent claims priority to U.S. Patent Application No. 63/623,720 by He et al., entitled "TECHNIQUES TO IMPROVE BOOT UP LATENCY OF A MEMORY SYSTEM," filed Jan. 22, 2024, which is assigned to the assignee hereof, and which is expressly incorporated by reference in its entirety herein.

TECHNICAL FIELD

The following relates to one or more systems for memory, including techniques to improve boot up latency of a memory system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states in response to being disconnected from an external power source.

DETAILED DESCRIPTION

Figure 1:
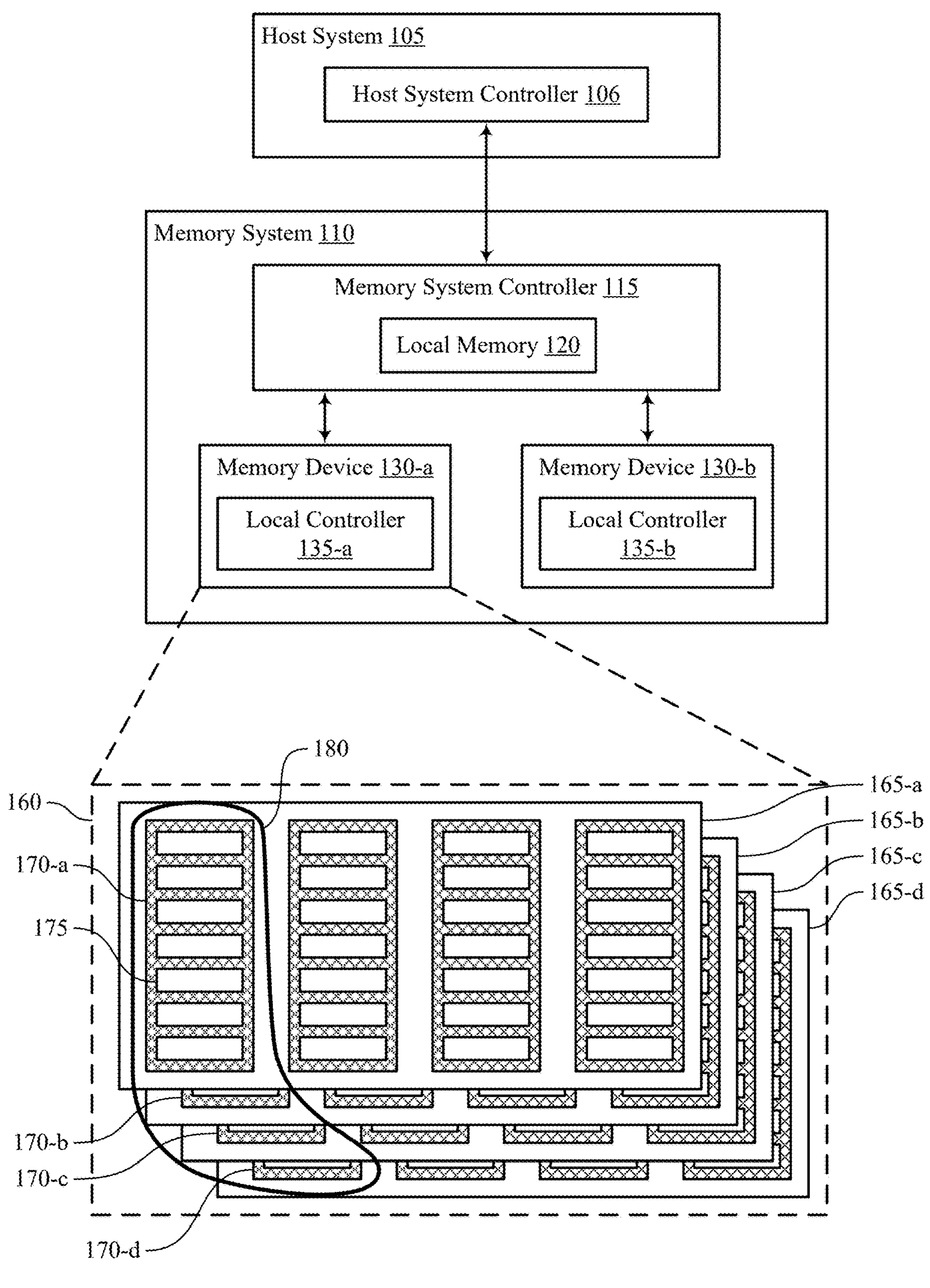
FIG. 1 shows an example of a system that supports techniques to improve boot up latency of a memory system in accordance with examples as disclosed herein.

In some examples, a host system may notify a memory system to perform a power down operation, such as an aperiodic power down operation. As part of the power down operation, such as the aperiodic power down operation, the memory system may write a power off notification (PON) to a first block of memory cells that is configured to store system information for the memory system. The PON may include an indication that the memory system performed an aperiodic power down operation (e.g., a "clean" power down operation). To perform a power up operation, the memory system may read the PON from the first block of memory cells as well as bad block information from a second block of memory cells and configuration information from a third block of memory cells.

However, to read information from the first block of memory cells, the second block of memory cells, and the third block of memory cells, the memory system may first perform a separate binary search operation on each of the first block of memory cells, the second block of memory cells, and the third block of memory cells. Performing the binary search operation on a block of memory cells may allow the memory system to identify which information within the block of memory cells is valid and current. However, performing three separate binary search operations during boot up of the memory system may result in unnecessary latency, among other challenges.

As described herein, the memory system may perform a single binary search operation at boot up resulting in less latency compared to other methods that include performing multiple binary searches. In response to the host system notifying the memory system of the aperiodic power down operation, the memory system may store the PON as well as last page information in a first block of memory cells configured to store bad block information. The last page information may include an indication of a last written page of a second block of memory cells configured to store the system information and/or a last written page of a third block of memory cells configured to store the configuration information.

During the power up operation, the memory system may perform a single binary search operation on the first block of memory cells and read the PON as well as the last page information from the first block of memory cells. Using the last page information, the memory system may read the system information from the second block of memory cells and the configuration information from the third block of memory cells. Using the methods as described herein may allow a memory system to improve (e.g., decrease) boot up latency.

In addition to applicability in memory systems as described herein, techniques for improving a boot up latency of a memory system may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by improving memory boot up speeds, which may decrease latency or otherwise improve user experience, among other benefits.

Features of the disclosure are illustrated and described in the context of systems, devices, and circuits. Features of the disclosure are further illustrated and described in the context of flowcharts.

FIG. 1 shows an example of a system 100 that supports techniques to improve boot up latency of a memory system in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be “block 0” of plane 165-*a*, block 170-*b* may be “block 0” of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support techniques to improve boot up latency of a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

As described herein, a memory system 110 may perform a single binary search operation at boot up to reduce latency associated with performing a power up operation. In some examples, the memory system 110 may receive aperiodic signaling from a host system 105 indicating for the memory system 110 to perform a power down operation. In response to receiving the signaling, the memory system 110 (e.g., the memory system controller 115 or the local controller 135-*a*) may write power down information (e.g., a PON or an indication of a last written page for one or more blocks 170) to a first portion of a first block 170. In some examples, the first block 170 may be an example of a bad block information block and a second portion of the first block 170 may be used to store bad block information.

Upon writing the power down information to the first block 170, the memory system 110 may perform the power down operation. At a later time, the memory system 110 may perform a power up operation. As part of the power up operation, the memory system 110 (e.g., the memory system controller 115 or the local controller 135-*a*) may perform a binary search on the first block 170 and read the power down information. Using the power down information, the memory system 110 may read information (e.g., system information or configuration information) from at least a second block 170 and complete the power up operation. In some examples, the memory system 110 may write the power down information to the first block 170 during or prior to each power down operation. Using the techniques as described herein may allow the memory system 110 to reduce boot up latency compared to other methods.

Figure 2:
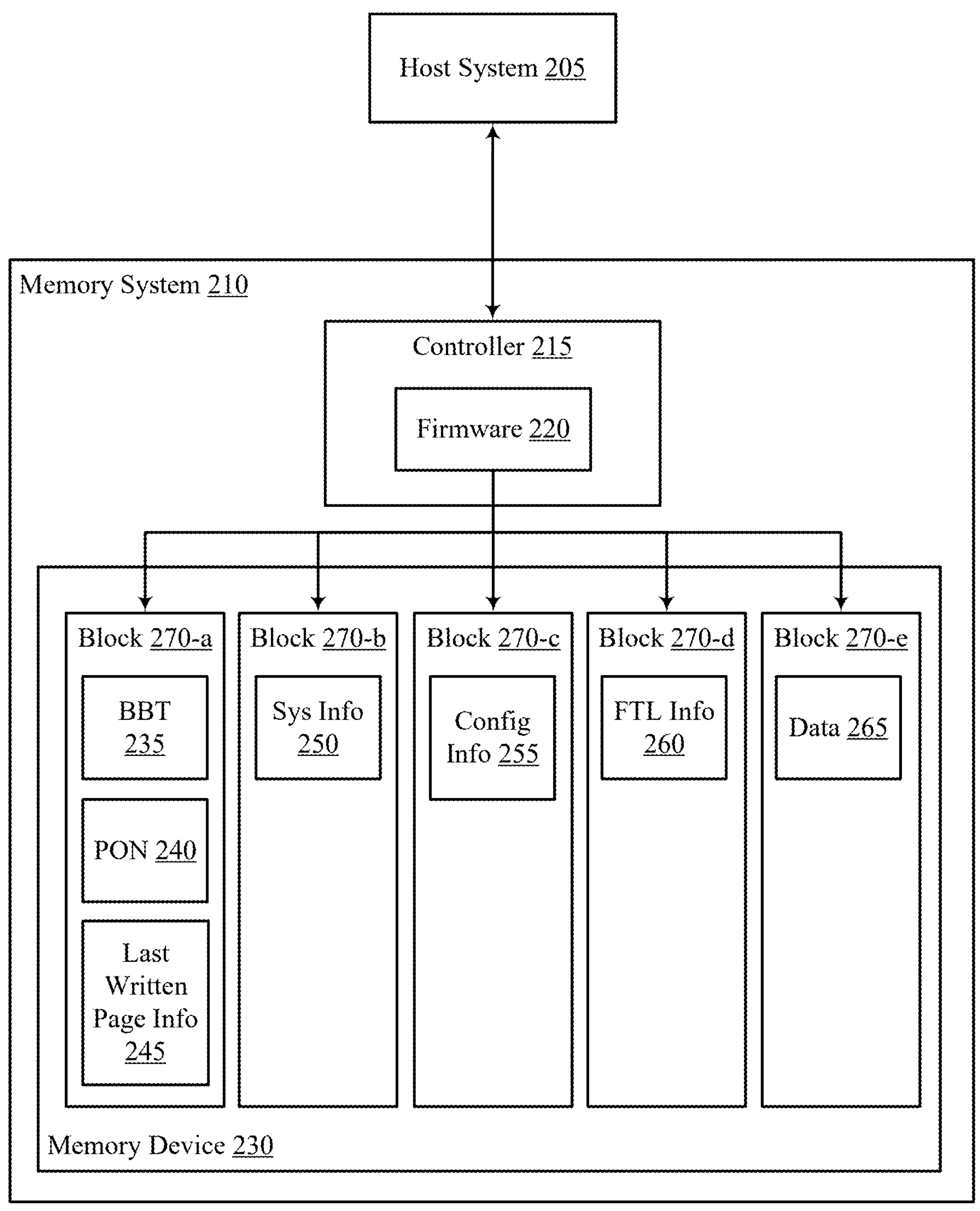
FIG. 2 shows an example of a system that supports techniques to improve boot up latency of a memory system in accordance with examples as disclosed herein.

FIG. 2 shows an example of a system 200 that supports techniques to improve boot up latency of a memory system in accordance with examples as disclosed herein. In some examples, the system 200 may implement aspects of a system 100. For example, a host system 205, a memory system 210, a controller 215, a memory device 230, and a block 270 may be examples of a host system 105, a memory system 110, a memory system controller 115, a memory device 130, and a block 170 as described with reference to FIG. 1, respectively.

In some examples, the memory system 210 may include a memory device 230. Located within the memory device 230 may be multiple blocks 270 of memory cells for storing information and in some examples, each block 270 may be associated with a respective memory function and may store information corresponding to the respective memory function. For example, the block 270-*a* may be an example of a bad block information block and may store bad block information such as a bad block table (BBT) 235. Blocks 270 contained in the BBT 235 may be blocks 270 that contain one or more invalid bits. In some examples, the bad block information may not consume the entirety of the block 270-*a* and at least a portion of the block 270-*a* may be unused.

Further, the memory device 230 may include the block 270-*b* which may be an example of a system block and may store system information 250 for the memory system 210. Additionally or alternatively, the memory device 230 may include a block 270-*c* which may be an example of a configuration block (or universal flash storage (UFS) attribute block) and may store configuration information 255 for the memory system 210. Additionally or alternatively, the memory device 230 may include the block 270-*d* which may be an example of a flash translation layer (FTL) block and may store FTL information 260 for the memory system 210. Additionally or alternatively, the block 270-*e* may be an example of a data block and may store data 265 for the memory system 210.

At aperiodic times, the memory system 210 may experience power down. To initiate a power down operation at the memory system 210, the host system 205 may transmit signaling to the memory system 210 notifying the memory system 210 of the power down operation. Upon receiving the signaling, the memory system 210 may write a PON 240 to at least a portion of the system block of the memory system 210 (e.g., the block 270-*b*) and perform the power down operation. In some examples, the PON 240 may be an example of a one bit flag. A logic value of the one bit flag may indicate whether the memory system 210 performed a power down operation. For example, a logic value of 1 may indicate that a power down operation was performed by the memory system.

After a period of shutdown, the memory system 210 may transition to a power on state. To transition to the power on state, the memory system 210 may perform a power up operation. During the power up operation, the memory system 210 may perform a binary read operation on at least the block 270-*a*, the block 270-*b*, and the block 270-*c*. Performing a binary read operation on a block 270 may allow the memory system 210 to determine a last written page of the block 270 prior to the power down operation and therefore, may allow the memory system 210 to determine what information stored in the block 270 is valid and up-to-date. Binary search may be defined as an algorithm that can be used to find a target value (e.g., a last written page) within a sorted array or list of items (e.g., pages of a block 270).

After performing the binary search operation on the block 270-*a*, the block 270-*b*, and the block 270-*c*, the memory system may read the PON 240 from the block 270-*a*, the system information 250 from the block 270-*b*, and the configuration information 255 from the block 270-*c*. In some examples, the system information 250 may include information corresponding to the block 270-*d* and the block

270-*e* (e.g., last written page information for the block 270-*d* and the block 270-*e*). Thus, after reading the system information 250 from the block 270-*b*, the memory system 210 may perform access operations on the block 270-*d* and the block 270-*e* (e.g., without performing a binary search on the block 270-*d* and the block 270-*e*). In some examples, the memory system 210 may perform the binary search operation on the block 270-*a* followed by the block 270-*b* and the block 270-*c*. The memory system 210 may initially perform the binary search operation on the block 270-*a* to read the BBT 235 and determine the bad blocks 270 of the memory system 210 (e.g., determine whether the block 270-*b* and the block 270-*c* are bad blocks).

Thus, in order for the memory system 210 to perform the power on operation, the memory system 210 may perform three separate binary searches. A first binary search is performed on the block 270-*a* to read the PON 240, a second binary search is performed on the block 270-*b* to read the system information 250, and a third binary search is performed on the block 270-*c* to read the configuration information 255. But performing three separate binary searches for each power up operation may introduce unnecessary latency into the memory system 210.

As described herein, the memory system 210 may perform one binary search operation during the power on operation which may reduce latency associated with powering on the memory system 210 compared to other methods. In some examples, the memory system 210 may perform a power down operation. To initiate the power down operation, the host system 205 may transmit signaling to the memory system 210 that includes an indication to perform the power down operation at the memory system 210. Upon receiving the indication to perform the power down operation, the memory system 210 (e.g., firmware 220) may write information corresponding to the power down operation to the block 270-*a* (or the bad block information block).

The block 270-*a* may include a set of memory cells divided into at least a first subset of memory cells and a second subset of memory cells. The first subset of memory cells may be allocated for the BBT 235 and the second subset of memory cells may be allocated for the information corresponding to the power down operation. In some examples, the second subset of memory cells may correspond to the unused portion of the block 270-*a* as described herein. Thus, the memory system 210 may store at least a portion of the BBT 235 in the first subset of memory cells of the block 270-*a* and the bad block information in the second subset of memory cells of the block 270-*a*.

The information corresponding to the power down operation may include one or both of a PON 240 and last written page information 245. The PON 240 may be an example of a one bit flag that indicates that the memory system 210 performed the power down operation. The last written page information 245 may include an indication of a first memory location (e.g., memory address) that corresponds to a last written page of the block 270-*b* prior to the power down operation, an indication of a second memory location (e.g., memory address) that corresponds to a last written page of the block 270-*b* prior to the power down operation, or both.

After being in a power off state for a period of time, the memory system 210 may perform a power up operation to transition the memory system 210 from the power off state to a power on state. During the power up operation, the memory system 210 (e.g., firmware 220) may perform a binary search operation on the block 270-*a* to determine a last written page of the block 270-*a* prior to the power down operation and validate the information stored in the block 270-*a* (e.g., the BBT 235, the PON 240, the last written page information 245, etc.).

After performing the binary search operation on the block 270-*a*, the memory system 210 may read the PON 240 from the block 270-*a* and determine that the memory system 210 previously performed the power down operation (e.g., prior to the power up operation). Additionally, the memory system 210 may read the last written page information 245 from the block 270-*a*. Using the last written page information 245, the memory system 210 may determine the last written page of the block 270-*c* (e.g., using the first memory location) and the last written page of the block 270-*d* (e.g., using the second memory location). Upon reading the information corresponding to the power down operation from the block 270-*a*, the memory system 210 may complete the power up operation, for example, by reading system information 250 from the block 270-*b* and configuration information 255 from the block 270-*c*.

At the conclusion of the power up operation, the memory system 210 may update (or revert) the PON 240 such that the PON 240 no longer indicates that a power down operation was performed at the memory system 210. For example, the memory system 210 may change a logic value of the PON 240 from a logic value of 0 to a logic value of 1. In some examples, the memory system 210 may repeat the methods as described herein for each periodic power down experienced by the memory system 210. Using the techniques described herein may allow a memory system to perform a single binary operation during boot up which may improve the boot up latency of the memory system 210 as compared to other techniques (e.g., performing three binary search operations).

Figure 3:
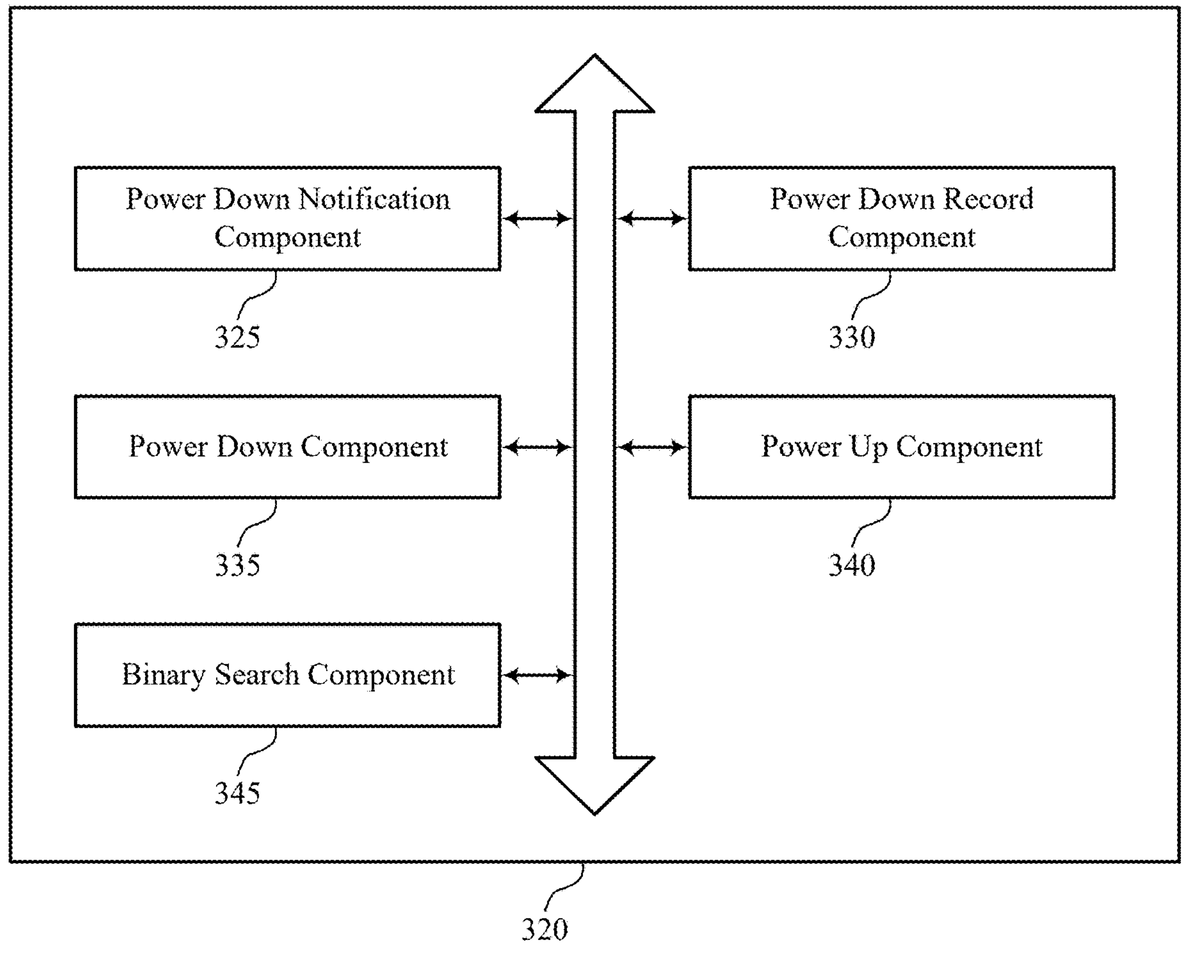
FIG. 3 shows a block diagram of a memory system that supports techniques to improve boot up latency of a memory system in accordance with examples as disclosed herein.

FIG. 3 shows a block diagram 300 of a memory system 320 that supports techniques to improve boot up latency of a memory system in accordance with examples as disclosed herein. The memory system 320 may be an example of aspects of a memory system as described with reference to FIGS. 1 through 2. The memory system 320, or various components thereof, may be an example of means for performing various aspects of techniques to improve boot up latency of a memory system as described herein. For example, the memory system 320 may include a power down notification component 325, a power down record component 330, a power down component 335, a power up component 340, a binary search component 345, or any combination thereof. Each of these components, or components of subcomponents thereof (e.g., one or more processors, one or more memories), may communicate, directly or indirectly, with one another (e.g., via one or more buses).

The power down notification component 325 may be configured as or otherwise support a means for receiving signaling including an indication to perform a power down operation at the memory system. The power down record component 330 may be configured as or otherwise support a means for writing, based at least in part on the indication to perform the power down operation, information corresponding to the power down operation to a first portion of a first block of memory cells, where a second portion of the first block of memory cells is used to store bad block information. The power down component 335 may be configured as or otherwise support a means for performing the power down operation at the memory system based at least in part on writing the information corresponding to the power down operation to the first block of memory cells.

In some examples, the information corresponding to the power down operation includes one or more of an indication that the memory system performed the power down operation or an indication of a memory location within a second block of memory cells.

In some examples, the memory location corresponds to a last written page within the second block prior to the memory system performing the power down operation. In some examples, the second block is used to store configuration information for the memory system or system information for the memory system. In some examples, the indication that the memory system performed the power down operation includes a one bit flag.

In some examples, the power up component 340 may be configured as or otherwise support a means for reading the information corresponding to the power down operation from the first block of memory cells based at least in part on performing a power up operation at the memory system.

In some examples, the binary search component 345 may be configured as or otherwise support a means for performing, based at least in part on performing the power up operation, a binary search operation on the first block of memory cells to determine a last written memory location within the first block, where reading the information corresponding to the power down operation is based at least in part on performing the binary search operation.

In some examples, the power up component 340 may be configured as or otherwise support a means for reading configuration information for the memory system from a second block of memory cells based at least in part on the information corresponding to the power down operation.

In some examples, the power up component 340 may be configured as or otherwise support a means for reading system information for the memory system from a third block of memory cells based at least in part on the information corresponding to the power down operation.

In some examples, the described functionality of the memory system 320, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 320, or various components thereof, may be implemented at least in part by instructions (e.g., stored in memory, non-transitory computer-readable medium) executable by such at least one processor.

Figure 4:
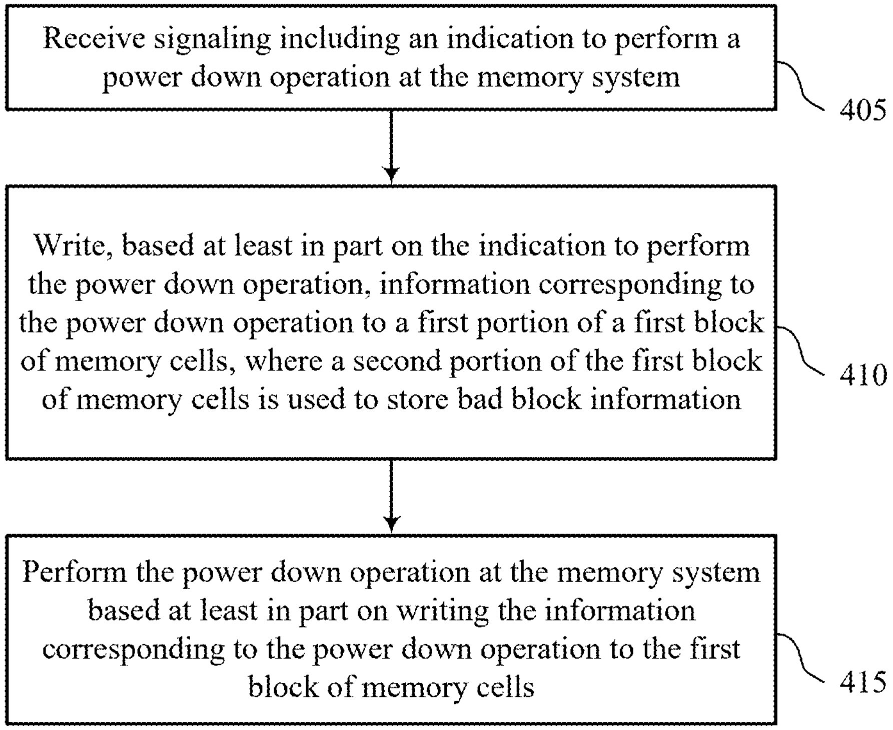
FIGS. 4 and 5 show flowcharts illustrating a method or methods that support techniques to improve boot up latency of a memory system in accordance with examples as disclosed herein.

FIG. 4 shows a flowchart illustrating a method 400 that supports techniques to improve boot up latency of a memory system in accordance with examples as disclosed herein. The operations of method 400 may be implemented by a memory system or its components as described herein. For example, the operations of method 400 may be performed by a memory system as described with reference to FIGS. 1 through 3. In some examples, a memory system may execute a set of instructions to control the functional elements of the device to perform the described functions. Additionally, or alternatively, the memory system may perform aspects of the described functions using special-purpose hardware.

At 405, the method may include receiving signaling including an indication to perform a power down operation at the memory system. In some examples, aspects of the operations of 405 may be performed by a power down notification component 325 as described with reference to FIG. 3.

At 410, the method may include writing, based at least in part on the indication to perform the power down operation, information corresponding to the power down operation to a first portion of a first block of memory cells, where a second portion of the first block of memory cells is used to store bad block information. In some examples, aspects of the operations of 410 may be performed by a power down record component 330 as described with reference to FIG. 3.

At 415, the method may include performing the power down operation at the memory system based at least in part on writing the information corresponding to the power down operation to the first block of memory cells. In some examples, aspects of the operations of 415 may be performed by a power down component 335 as described with reference to FIG. 3.

In some examples, an apparatus as described herein may perform a method or methods, such as the method 400. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving signaling including an indication to perform a power down operation at the memory system; writing, based at least in part on the indication to perform the power down operation, information corresponding to the power down operation to a first portion of a first block of memory cells, where a second portion of the first block of memory cells is used to store bad block information; and performing the power down operation at the memory system based at least in part on writing the information corresponding to the power down operation to the first block of memory cells.

Aspect 2: The method, apparatus, or non-transitory computer-readable medium of aspect 1, where the information corresponding to the power down operation includes one or more of an indication that the memory system performed the power down operation or an indication of a memory location within a second block of memory cells.

Aspect 3: The method, apparatus, or non-transitory computer-readable medium of aspect 2, where the memory location corresponds to a last written page within the second block prior to the memory system performing the power down operation.

Aspect 4: The method, apparatus, or non-transitory computer-readable medium of any of aspects 2 through 3, where the second block is used to store configuration information for the memory system or system information for the memory system.

Aspect 5: The method, apparatus, or non-transitory computer-readable medium of any of aspects 2 through 4, where the indication that the memory system performed the power down operation includes a one bit flag.

Aspect 6: The method, apparatus, or non-transitory computer-readable medium of any of aspects 1 through 5, further including operations, features, circuitry, logic, means, or instructions, or any combination thereof for reading the information corresponding to the power down operation from the first block of memory cells based at least in part on performing a power up operation at the memory system.

Aspect 7: The method, apparatus, or non-transitory computer-readable medium of aspect 6, further including operations, features, circuitry, logic, means, or instructions, or any combination thereof for performing, based at least in part on performing the power up operation, a binary search operation on the first block of memory cells to determine a last written memory location within the first block, where reading the information corresponding to the power down operation is based at least in part on performing the binary search operation.

Aspect 8: The method, apparatus, or non-transitory computer-readable medium of any of aspects 6 through 7, further including operations, features, circuitry, logic, means, or instructions, or any combination thereof for reading configuration information for the memory system from a second block of memory cells based at least in part on the information corresponding to the power down operation.

Aspect 9: The method, apparatus, or non-transitory computer-readable medium of any of aspects 6 through 8, further including operations, features, circuitry, logic, means, or instructions, or any combination thereof for reading system information for the memory system from a third block of memory cells based at least in part on the information corresponding to the power down operation.

Figure 5:
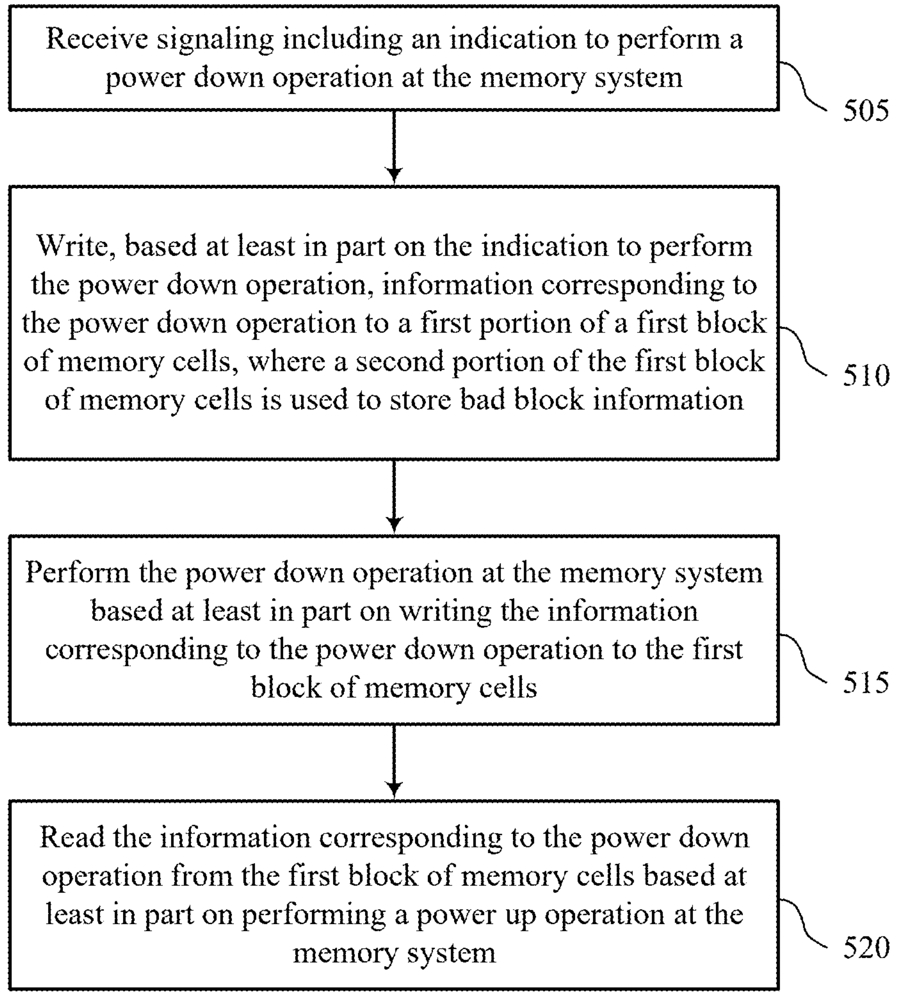

FIG. 5 shows a flowchart illustrating a method 500 that supports techniques to improve boot up latency of a memory system in accordance with examples as disclosed herein. The operations of method 500 may be implemented by a memory system or its components as described herein. For example, the operations of method 500 may be performed by a memory system as described with reference to FIGS. 1 through 3. In some examples, a memory system may execute a set of instructions to control the functional elements of the device to perform the described functions. Additionally, or alternatively, the memory system may perform aspects of the described functions using special-purpose hardware.

At 505, the method may include receiving signaling including an indication to perform a power down operation at the memory system. In some examples, aspects of the operations of 505 may be performed by a power down notification component 325 as described with reference to FIG. 3.

At 510, the method may include writing, based at least in part on the indication to perform the power down operation, information corresponding to the power down operation to a first portion of a first block of memory cells, where a second portion of the first block of memory cells is used to store bad block information. In some examples, aspects of the operations of 510 may be performed by a power down record component 330 as described with reference to FIG. 3.

At 515, the method may include performing the power down operation at the memory system based at least in part on writing the information corresponding to the power down operation to the first block of memory cells. In some examples, aspects of the operations of 515 may be performed by a power down component 335 as described with reference to FIG. 3.

At 520, the method may include reading the information corresponding to the power down operation from the first block of memory cells based at least in part on performing a power up operation at the memory system. In some examples, aspects of the operations of 520 may be performed by a power up component 340 as described with reference to FIG. 3.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 10: A memory system, including: a first block of memory cells configured to store bad block information for the memory system; a second block of memory cells configured to store configuration information for the memory system; a third block of memory cells configured to store system information for the memory system; and a controller configured to cause the memory system to: write information corresponding to a power down operation of the memory system to the first block of memory cells based at least in part on an indication to perform a power down operation; perform the power down operation at the memory system based at least in part on writing the information corresponding to the power down operation to the first block of memory cells; read the information corresponding to the power down operation from the first block of memory cells based at least in part on performing a power up operation; and read the configuration information from the second block of memory cells and the system information from the third block of memory cells based at least in part on the information corresponding to the power down operation.

Aspect 11: The memory system of aspect 10, where the information corresponding to the power down operation includes one or more of an indication that the memory system performed the power down operation, an indication of a first memory location within the second block of memory cells, or an indication of a second memory location within the third block of memory cells.

Aspect 12: The memory system of aspect 11, where the first memory location corresponds to a last written page within the second block prior to the memory system performing the power down operation and the second memory location corresponds to a last written page within the third block prior to the memory system performing the power down operation.

Aspect 13: The memory system of any of aspects 11 through 12, where the indication that the memory system performed the power down operation includes a one bit flag.

Aspect 14: The memory system of any of aspects 10 through 13, where the controller is further configured to cause the memory system to: perform, based at least in part on the power up operation, a binary search operation on the first block of memory cells to determine a last written memory location within the first block, where reading the information corresponding to the power down operation is based at least in part on the binary search operation.

Aspect 15: The memory system of any of aspects 10 through 14, where the controller is further configured to cause the memory system to: write information corresponding to a second power down operation of the memory system to the first block of memory cells based at least in part on an indication to perform the second power down operation; perform the second power down operation at the memory system based at least in part on writing the information corresponding to the second power down operation to the first block of memory cells; and read the information corresponding to the second power down operation from the first block of memory cells based at least in part on performing a second power up operation.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit in response to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

one or more memory devices; and processing circuitry coupled with the one or more memory devices and configured to cause the memory system to:

receive signaling comprising an indication to perform a power down operation at the memory system;

write, based at least in part on the indication to perform the power down operation, information corresponding to the power down operation to a first portion of a first block of memory cells, wherein a second portion of the first block of memory cells is used to store bad block information; and perform the power down operation at the memory system based at least in part on writing the information corresponding to the power down operation to the first block of memory cells.

2. The memory system of claim 1, wherein the information corresponding to the power down operation comprises one or more of an indication that the memory system performed the power down operation or an indication of a memory location within a second block of memory cells.

3. The memory system of claim 2, wherein the memory location corresponds to a last written page within the second block prior to the memory system performing the power down operation.

4. The memory system of claim 2, wherein the second block is used to store configuration information for the memory system or system information for the memory system.

5. The memory system of claim 2, wherein the indication that the memory system performed the power down operation comprises a one bit flag.

6. The memory system of claim 1, wherein the processing circuitry is further configured to cause the memory system to:

read the information corresponding to the power down operation from the first block of memory cells based at least in part on performing a power up operation at the memory system.

7. The memory system of claim 6, wherein the processing circuitry is further configured to cause the memory system to:

perform, based at least in part on performing the power up operation, a binary search operation on the first block of memory cells to determine a last written memory location within the first block, wherein reading the information corresponding to the power down operation is based at least in part on performing the binary search operation.

8. The memory system of claim 6, wherein the processing circuitry is further configured to cause the memory system to:

read configuration information for the memory system from a second block of memory cells based at least in part on the information corresponding to the power down operation.

9. The memory system of claim 6, wherein the processing circuitry is further configured to cause the memory system to:

read system information for the memory system from a third block of memory cells based at least in part on the information corresponding to the power down operation.

10. A memory system, comprising:

a first block of memory cells configured to store bad block information for the memory system;

a second block of memory cells configured to store configuration information for the memory system;

a third block of memory cells configured to store system information for the memory system; and a controller configured to cause the memory system to:

write information corresponding to a power down operation of the memory system to the first block of memory cells based at least in part on an indication to perform a power down operation;

perform the power down operation at the memory system based at least in part on writing the information corresponding to the power down operation to the first block of memory cells;

read the information corresponding to the power down operation from the first block of memory cells based at least in part on performing a power up operation; and read the configuration information from the second block of memory cells and the system information from the third block of memory cells based at least in part on the information corresponding to the power down operation.

11. The memory system of claim 10, wherein the information corresponding to the power down operation comprises one or more of an indication that the memory system performed the power down operation, an indication of a first memory location within the second block of memory cells, or an indication of a second memory location within the third block of memory cells.

12. The memory system of claim 11, wherein the first memory location corresponds to a last written page within the second block prior to the memory system performing the power down operation and the second memory location corresponds to a last written page within the third block prior to the memory system performing the power down operation.

13. The memory system of claim 11, wherein the indication that the memory system performed the power down operation comprises a one bit flag.

14. The memory system of claim 10, wherein the controller is further configured to cause the memory system to:

perform, based at least in part on the power up operation, a binary search operation on the first block of memory cells to determine a last written memory location within the first block, wherein reading the information corresponding to the power down operation is based at least in part on the binary search operation.

15. The memory system of claim 10, wherein the controller is further configured to cause the memory system to:

write information corresponding to a second power down operation of the memory system to the first block of memory cells based at least in part on an indication to perform the second power down operation;

perform the second power down operation at the memory system based at least in part on writing the information corresponding to the second power down operation to the first block of memory cells; and read the information corresponding to the second power down operation from the first block of memory cells based at least in part on performing a second power up operation.

16. A non-transitory computer-readable medium storing code comprising instructions which, when executed by one or more processors of a memory system, cause the memory system to:

receive signaling comprising an indication to perform a power down operation at the memory system;

write, based at least in part on the indication to perform the power down operation, information corresponding to the power down operation to a first portion of a first block of memory cells, wherein a second portion of the first block of memory cells is used to store bad block information; and perform the power down operation at the memory system based at least in part on writing the information corresponding to the power down operation to the first block of memory cells.

17. The non-transitory computer-readable medium of claim 16, wherein the information corresponding to the power down operation comprises one or more of an indication that the memory system performed the power down operation or an indication of a memory location within a second block of memory cells.

18. The non-transitory computer-readable medium of claim 17, wherein the memory location corresponds to a last written page within the second block prior to the memory system performing the power down operation.

19. The non-transitory computer-readable medium of claim 17, wherein the second block is used to store configuration information for the memory system or system information for the memory system.

20. The non-transitory computer-readable medium of claim 17, wherein the indication that the memory system performed the power down operation comprises a one bit flag.

21. The non-transitory computer-readable medium of claim 16, wherein the instructions, when executed by the one or more processors of the memory system, further cause the memory system to:

read the information corresponding to the power down operation from the first block of memory cells based at least in part on performing a power up operation at the memory system.

22. The non-transitory computer-readable medium of claim 21, wherein the instructions, when executed by the one or more processors of the memory system, further cause the memory system to:

perform, based at least in part on performing the power up operation, a binary search operation on the first block of memory cells to determine a last written memory location within the first block, wherein reading the information corresponding to the power down operation is based at least in part on performing the binary search operation.

23. The non-transitory computer-readable medium of claim 21, wherein the instructions, when executed by the one or more processors of the memory system, further cause the memory system to:

read configuration information for the memory system from a second block of memory cells based at least in part on the information corresponding to the power down operation.

24. The non-transitory computer-readable medium of claim 21, wherein the instructions, when executed by the one or more processors of the memory system, further cause the memory system to:

read system information for the memory system from a third block of memory cells based at least in part on the information corresponding to the power down operation.

25. A method by a memory system, comprising:

receiving signaling comprising an indication to perform a power down operation at the memory system;

writing, based at least in part on the indication to perform the power down operation, information corresponding to the power down operation to a first portion of a first block of memory cells, wherein a second portion of the first block of memory cells is used to store bad block information; and performing the power down operation at the memory system based at least in part on writing the information corresponding to the power down operation to the first block of memory cells.

26. The method of claim 25, wherein the information corresponding to the power down operation comprises one or more of an indication that the memory system performed the power down operation or an indication of a memory location within a second block of memory cells.

27. The method of claim 26, wherein the memory location corresponds to a last written page within the second block prior to the memory system performing the power down operation.

28. The method of claim 26, wherein the second block is used to store configuration information for the memory system or system information for the memory system.

29. The method of claim 26, wherein the indication that the memory system performed the power down operation comprises a one bit flag.

30. The method of claim 25, further comprising:

reading the information corresponding to the power down operation from the first block of memory cells based at least in part on performing a power up operation at the memory system.

31. The method of claim 30, further comprising:

performing, based at least in part on performing the power up operation, a binary search operation on the first block of memory cells to determine a last written memory location within the first block, wherein reading the information corresponding to the power down operation is based at least in part on performing the binary search operation.

32. The method of claim 30, further comprising:

reading configuration information for the memory system from a second block of memory cells based at least in part on the information corresponding to the power down operation.

33. The method of claim 30, further comprising:

reading system information for the memory system from a third block of memory cells based at least in part on the information corresponding to the power down operation.

* * * * *